Sept. 12, 1967 J. F. DYBEN 3,341,774

CAPACITANCE DETECTOR HAVING A TRANSMITTER CONNECTED TO ONE PLATE AND A RECEIVER CONNECTED TO ANOTHER PLATE

Filed July 17, 1962 6 Sheets-Sheet 1

INVENTOR.
JERRY F. DYBEN

BY Hobbs & Caston

ATTORNEYS

INVENTOR.
JERRY F. DYBEN
BY Hobbs & Caston
ATTORNEYS

Sept. 12, 1967 J. F. DYBEN 3,341,774

CAPACITANCE DETECTOR HAVING A TRANSMITTER CONNECTED TO ONE PLATE AND A RECEIVER CONNECTED TO ANOTHER PLATE

Filed July 17, 1962

6 Sheets-Sheet 3

INVENTOR.

JERRY F. DYBEN

BY Hobbs & Caston

ATTORNEYS

Sept. 12, 1967 J. F. DYBEN 3,341,774

CAPACITANCE DETECTOR HAVING A TRANSMITTER CONNECTED TO ONE PLATE AND A RECEIVER CONNECTED TO ANOTHER PLATE

Filed July 17, 1962 6 Sheets-Sheet 4

INVENTOR
JERRY F. DYBEN
BY Hobbs & Easton
ATTORNEYS

INVENTOR.
JERRY F. DYBEN
BY Hobbs & Easton
ATTORNEYS

INVENTOR.
JERRY F. DYBEN
BY Hobbs & Easton
ATTORNEYS 3,341,774

CAPACITANCE DETECTOR HAVING A TRANSMITTER CONNECTED TO ONE PLATE AND A RECEIVER CONNECTED TO ANOTHER PLATE

Jerry F. Dyben, South Bend, Ind., assignor to Communications Research, Inc., South Bend, Ind., a corporation of Indiana Filed July 17, 1962, Ser. No. 210,326
8 Claims. (Cl. 324—61)

The present invention relates to measuring and detecting devices, and more particularly to a device for detecting objects by changes in the capacitance of a capacitor and measuring the change.

Devices for measuring the thickness, density, or moisture content of objects, for detecting the presence and position or absence of objects, animals, or people, for determining the level of solids or liquids in containers, and for measuring both metallic and non-metallic objects, by detecting and measuring the capacitance change in an electrical circuit due to the objects' presence, have been known for many years. However, in the past, the users of these devices have experienced many difficulties. The devices lacked versatility, so that for example a device built to serve as a burglar alarm at night was completely useless during the day, while separate devices had to be used to count the number of articles passing a point on a conveyor belt and to determine the density of those articles. Therefore, one principal object of the present invention is to provide an active capacitive detector which is highly versatile, and which may be both quickly and easily modified for different uses and connected to be used in several places or for several uses in a short time.

A further disadvantage of many capacitive detectors is that one of the plates of the detecting capacitor is grounded, rendering the detector useless for many purposes, for example, for detecting the position of a break in a concealed open circuit. Therefore, another principal object of the present invention is to provide a versatile capacitive detector which is able to measure capacitance changes in many different forms of capacitors having neither plate grounded, including those using an electrical circuit or other metallic configuration for one or both plates.

Yet another major disadvantage of many capacitive detectors is that their operation is affected by temperature, with ordinary room temperatures in the summer or temperature variations rendering them inoperable or inaccurate. Still other devices are compensated for temperature, but at the cost of simplicity and convenience of placement and operation. Therefore, a further object of the present invention is to provide a capacitive detector and measuring device which is unaffected by either high temperatures or by variations in the temperature.

Many previous counting devices could be actuated readily by objects other than those they were counting. For example, a man might accidentally place his hand in a capacitive field or in front of a photoelectric cell and cause the device to count it, or he might leave his hand there while several articles passed, preventing their being counted. Therefore, another object of the present invention is to provide a capacitive detector which is operable to respond only to sudden changes in the capacitance.

An additional object of the invention is to provide a detector which will detect the presence of motion, and which may be adjusted to detect only motion faster than a fixed rate.

A further object is to provide a capacitive detector which will detect and measure both metallic and non-metallic articles.

Still another object of the invention is to provide a detector of the foregoing type which is extremely sensitive without being affected by outside radiation or internal electronic noise.

Another object of the invention is to provide a capacitive detector which will detect the position of the break in an open circuit in concealed or buried wiring.

An additional object is to provide a device of the type described which combines simplicity of design and small size with ease of installation, and which is still highly versatile.

Yet another object of the present invention is to provide a rugged and versatile measuring and detecting device which is simple to manufacture from easily obtained components and can be used over a long period of time with a minimum of maintenance.

Additional objects and advantages of the present invention will become apparent from the following description and accompanying drawings, wherein.

Figure 1:
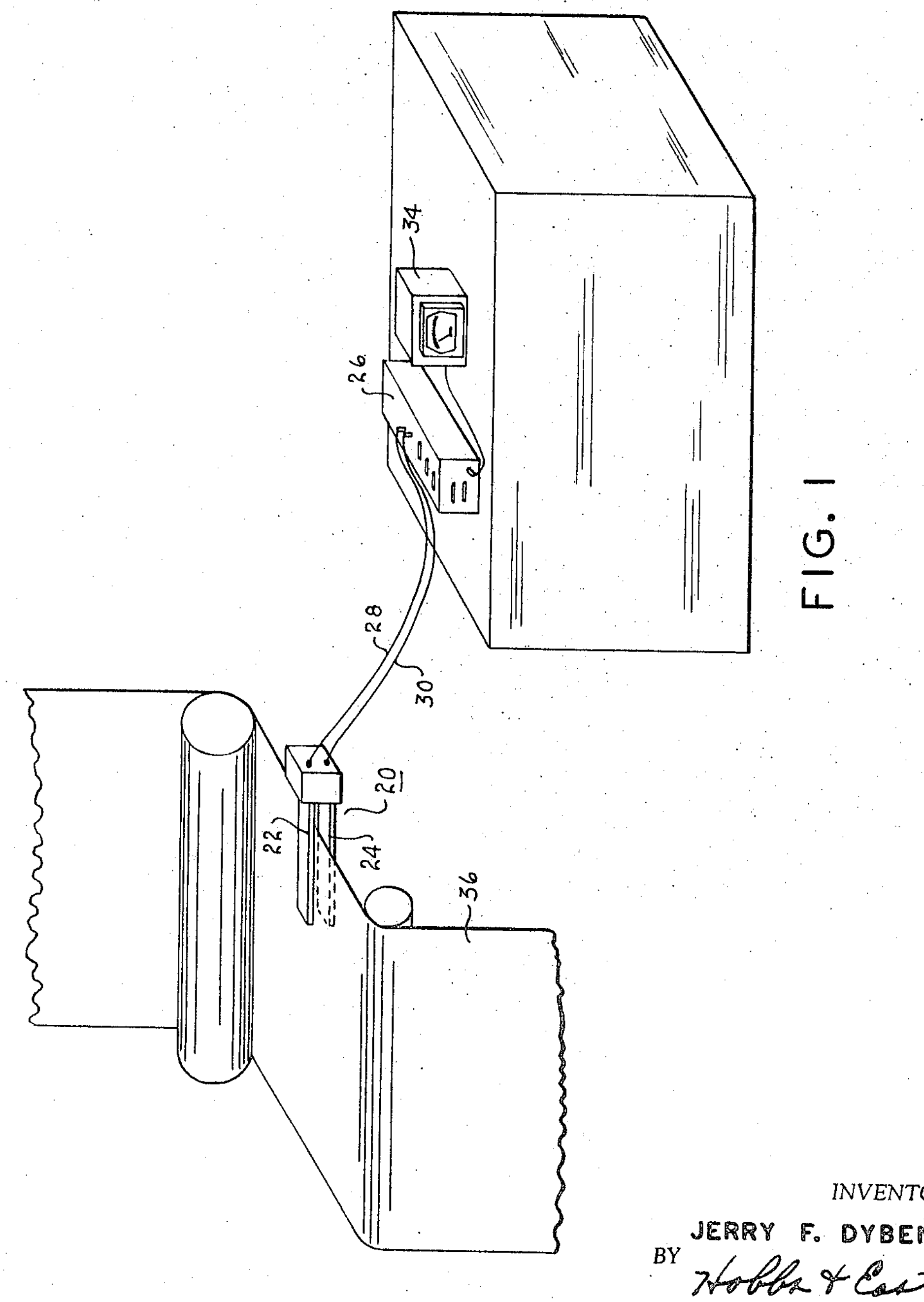
FIGURE 1 is a perspective view of the present invention being utilized to measure the thickness of sheet material.

Referring more specifically to the drawings, and to FIGURE 1 in particular, sensing capacitor 20, having plates 22 and 24, is connected to a combined transmitter and receiver 26 by cables 28 and 30 of fixed capacitance. Transmitter and receiver 26 are connected to a meter 34. In the application of the invention shown in FIGURE 1, sheet material 36 passes between plates 22 and 24, the varying thickness of the sheet varying the capacitance of sensing capacitor 20, and the variations in capacitance being amplified and modified in transmitter and receiver 26 and recorded by meter 34, as will be described in greater detail hereinafter.

Figure 2:
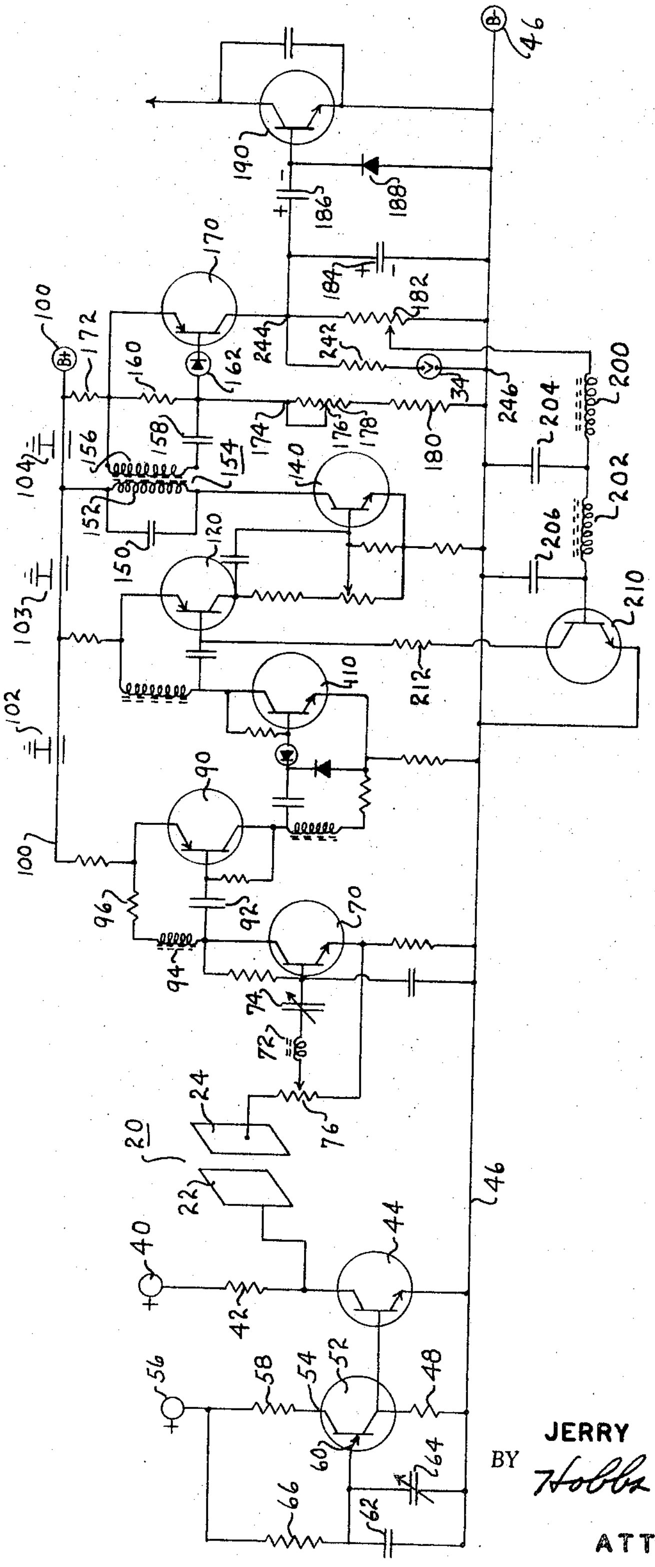
FIGURE 2 is a schematic view of the present invention.

Referring now to FIGURE 2, a positive buss 40 is connected through a resistor 42 to plate 22 and to the collector of an NPN transistor 44. The emitter of transistor 44 is connected to a negative buss 46, and the base voltage of transistor 44 is set from buss 46 through a resistor 48. The base voltage on transistor 44 is forward biased cyclically by the circuit including a unijunction 52. Terminal 54 of unijunction 52 is connected to a positive buss 56 through a resistor 58, while terminal 60 is connected to buss 46 through a capacitor 62 and varialble capacitor 64, connected in parallel, and to buss 56 through a resistor 66. The values of these components are chosen to render transistor 44 slightly conducting by maintaining a reverse bias on the base of the transistor through resistor 48 except for a short period in every cycle when the action of unijunction 52 connects buss 56 with the base of transistor 44 to forward bias the base and allow current to flow from buss 40 to buss 46. Throughout the remainder of this description, the values of the components are assumed to be such as to allow current to flow from buss 40 to buss 46 for 10 microseconds out of every 50 microseconds, giving a freqency of 20,000 cycles per second; however, this rate is readily varied by varying capacitor 64. If desired, a more powerful oscillator circuit may be utilized in place of the one including transistor 44.

Figure 3:
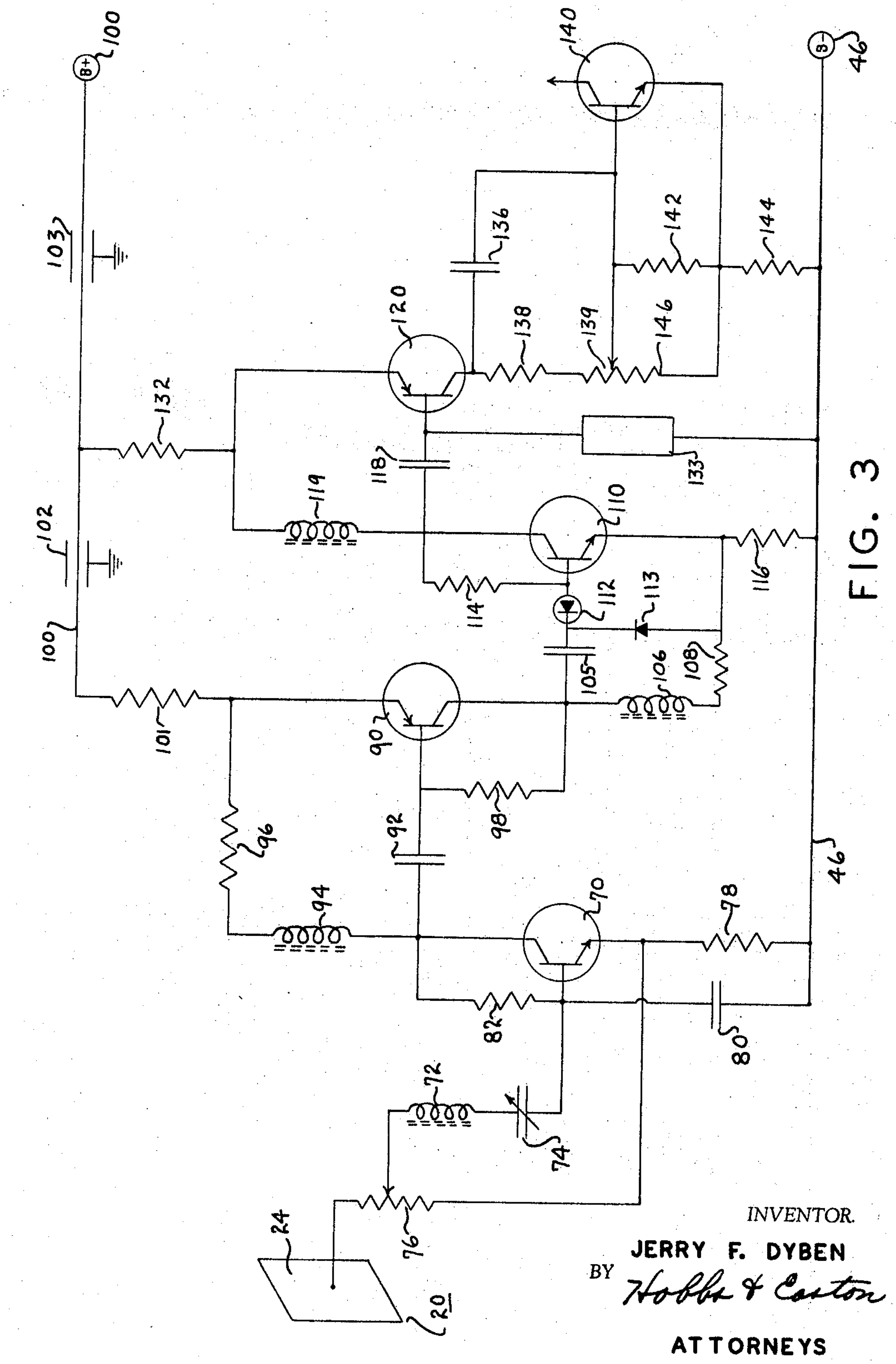
FIGURE 3 is a schematic diagram of a portion of the circuit shown in FIGURE 2.

Now referring to FIGURE 3, plate 24 of sensing capacitor 20 is connected to the base of an NPN transistor 70 through a resonating circuit consisting of a coil 72, and variable capacitor 74, and through a variable resistor 76 and resistor 78 in series to buss 46. Resistor 76 is varied to vary the amount of energy reaching the base of transistor 70, as will be described later. A slight forward bias is maintained on the base of transistor 70 by resistor 82. Capacitor 80 is a filter capacitor to reduce unwanted high frequency signals. Resistor 78 provides a slight amount of degeneration for more stable operation. The values of the components are chosen in such a manner that transistor 70 acts as a class C amplifier, and the resonating circut containing components 72 and 74 is tuned to 20 kc.; the action of these circuits will be explained in greater detail later.

The collector of transistor 70 is connected to a PNP transistor 90 through a circuit consisting of a capacitor 92, coil 94, and resistor 96 connected, in series in the order named, between the base and emitter of the transistor, with the collector of transistor 70 being connected between capacitor 92 and coil 94. The coil is wound in such a manner that it is a parallel resonant circuit at 20 kc. The base of transistor 90 is also connected to its collector through a resistor 98, and the emitter is connected to the positive buss 100 through a resistor 101. Feedthrough capacitors 102, 103, and 104 are provided for buss 100 to prevent high frequency signals which may appear on buss 100 from getting to the transistors of the invention. Transistors 70 and 90 form two stages of an amplifier, which may be modified by changing the number of stages or the powèr or by any other desired modification without departing from the present invention.

The collector of transistor 90 is connected through a resonating circuit consisting of a capacitor 105, a coil 106, wound in the same manner as coil 94, and a resistor 108, in series in the order named, between the base and emitter of a transistor 110, with a zener diode 112 connected between the capacitor and the base, and with the collector of transistor 90 connected between the capacitor and the coil. Although this resonating circuit acts to amplify the signal coming from the transistor 90 in much the same manner as the circuit between transistors 70 and 90, a diode 113 having one end connected between capacitor 105 and zener diode 112, and its other terminal connected to the emitter of transistor 110 acts to pass only the positive portions of the waves coming from transistor 90. Furthermore, zener diode 112 cuts off from transistor 110 all but the higher positive values of the remaining portions of the waves. Thus, only a pulsing DC current whose peak voltage depends on the value of capacitor 20, reaches the base of transistor 110. Resistor 114 between the base and the collector of the transistor provides a slight forward bias on the base, while resistor 116 connected between the emitter of transistor 110 and buss 46 stabilizes the operation.

The collector of transistor 110 is connected through a circuit consisting of a capacitor 118 and coil 119 to a PNP transistor 120, with the capacitor and coil in series between the base and the emitter of transistor 120. The emitter of transistor 120 is connected to buss 100 through a resistor 132. The collector of transistor 110 is connected between coil 119 and capacitor 118. After a negative pulse from the collector of transistor 110 has passed, a positive signal builds up through coil 119 and capacitor 118 until another pulse comes from transistor 110. Thus, a sawtooth waveform is produced at the base of transistor 120.

Figure 7:
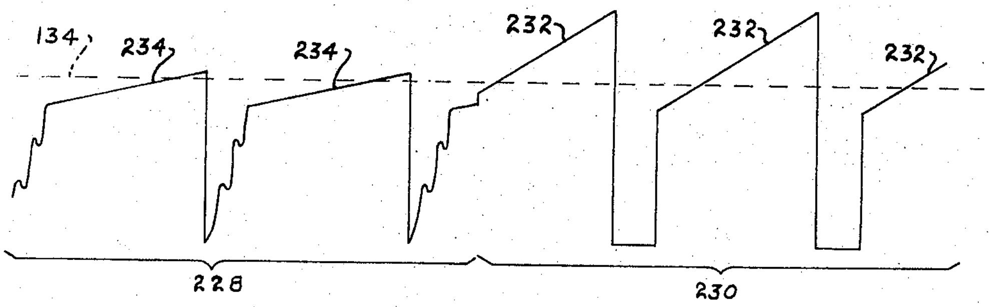
FIGURE 7 is a diagrammatic representation of the waveform at the base of still another of the transistors shown in FIGURES 2 and 3.
Figure 8:
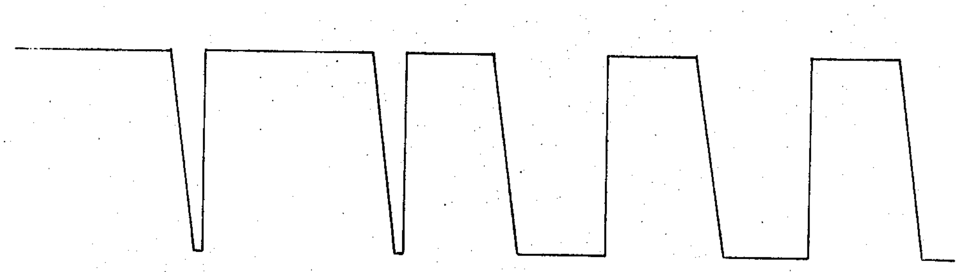
FIGURE 8 is a diagrammatic representation of the waveform at the collector of the transistor of FIGURE 7.

Transistor 120 is biased through forward bias circuitry 133 to maintain a full on condition until the sawtooth wave reaches a fixed positive voltage, denoted by numeral 134 in FIGURE 7, and is then turned completely off until the occurrence of the next pulse lowers the wave below the voltage 134. Thus, the waveform shown in FIGURE 8 appears at the collector of transistor 120.

The collector of transistor 120 is connected through a differentiator circuit consisting of a capacitor 136 in parallel with a resistor 138 and a variable resistor 139 to the base of an NPN transistor 140. The base is biased through resistors 142 and 144, in series, to buss 46, with the emitter of transistor 140 connected between resistors 142 and 144. Terminal 146 of resistor 139 is also connected between resistors 142 and 144.

Figure 10:
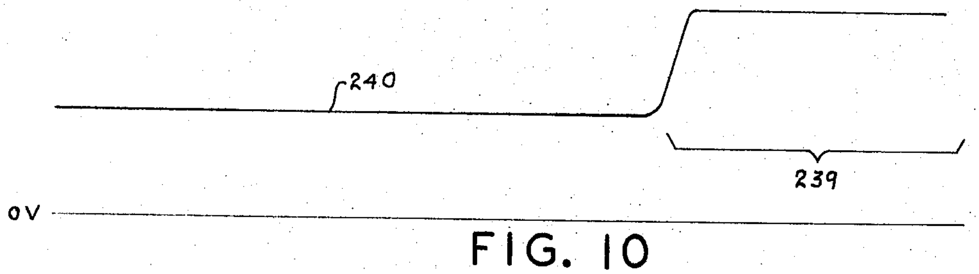
FIGURE 10 is a diagrammatic representation of the waveform at the collector of the transistor of FIGURE 9.

Referring again to FIGURE 2, the collector of transistor 140 is connected to a resonanting circuit consisting of a capacitor 150 and the primary 152 of a transformer 154. To counteract the effect of any DC drift that may have occurred in the first portion of the circuit, the pulses from the collector are then transformed to the secondary 156 of transformer 154, and thus into another resonating circuit consisting of secondary 156, a capacitor 158, and a resistor 160 connected in a series loop. The pulses are then transmitted through a zener diode 162, connected between the base of a PNP transistor 170 and the junction of resistor 160 and capacitor 158. The transformer's phase is such as to transform the negative-going pulses from the collector of transistor 140 into negative-going pulses at the base of transistor 170. The junction between secondary 156 and resistor 160 is connected to buss 100 through a resistor 172, and the junction between capacitor 158 and resistor 160 is connected to terminal 174 and armature 176 of a variable resistor 178 and thence through a resistor 180 to buss 46. Transistor 170 is biased to filter out all but the variation in the peak voltage at its base, giving a waveform at its collector, as shown in FIGURE 10.

The signal from the collector of transistor 170 is filtered in the high pass filter circuit consisting of a variable resistor 182, electrolytic capacitors 184 and 186, arranged as shown in FIGURE 2, and a diode 188, so that only a sudden positive increase in the voltage of the pulses from the collector of transistor 170 can actuate an NPN transistor 190 and allow current to flow through the coil of a relay or counter, not shown. If a relay is utilized, any desired action may then occur, such as ringing a bell.

As the temperature of the components used in the present invention rises, for example when the temperature of the room containing them rises, or during the warm-up period, the transistors allow more energy to pass, producing an increased basic voltage at the collector of transistor 170. In extreme cases, this increase may proceed so far that the basic voltage is equal to the maximum voltage passed by transistor 170, so that the peaks produced by changes in the capacitance of capacitor 20 do not reach transistor 190. Furthermore, in some cases, it is desired to measure the voltage at the collector of transistor 170, for example when determining the thickness or density of a material. In this case, the increase in temperature can lead to erroneous readings of these quantities.

To prevent this behavior, a small amount of energy is tapped from resistor 182 and passed through the filters consisting of coils 200 and 202 and capacitors 204 and 206 to the base of an NPN transistor 210. The collector of this transistor is connected through a resistor 212 to the base of transistor 120. Thus, when increased temperature increases the signal at the collector of transistor 170, the signal at the base of transistor 210 increases, forcing transistor 120 to conduct harder, so that the total voltage passing transistor 120 is smaller, compensating for the increase due to the increase in temperature. Since this compensation depends on the increase in voltage caused by the increase in temperature, it is completely reliable over a wide operating range. Clearly the action during a decrease in temperature is similar to the above.

The values of capacitors 204 and 206 and coils 200 and 202 are chosen to make the time constants of the two filter circuits give a total of approximately 3 to 4 seconds. This does not appreciably affect the response of this circuit to temperature changes, since most such changes occur over a period of minutes, rather than seconds, but the sudden changes in the voltage level caused by objects quickly passing through the field of capacitor 20 can not pass to transistor 210. Therefore, the temperature compensating circuit compensates for temperature only, and not for changes to be detected.

Figure 4:
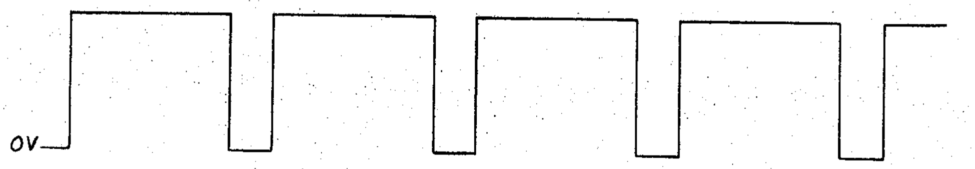
FIGURE 4 is a diagrammatic representation of the waveform produced by a transmitter utilized in the present invention.
Figure 5:
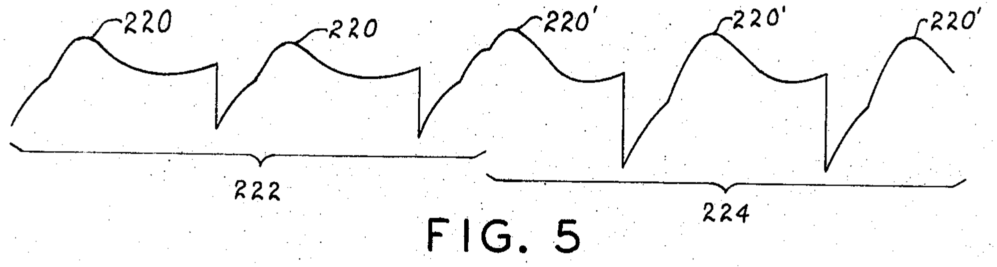
FIGURE 5 is a diagrammatic representation of the waveform at the base of one of the transistors shown in FIGURES 2 and 3.

In the operation of the present invention, as seen in FIGURE 4, a series of negative-going direct current pulses of 10 microseconds duration separated by a period of 40 microseconds, is generated in the transmitter section of the present invention, the transmitter including transistor 44 and unijunction 52. The pulses from the transmitter appear on plate 22 of sensing capacitor 20, and the resulting field is received by plate 24 and carried through coil 72 and capacitor 74 to the base of transistor 70. As seen in FIGURE 5, the waveform changes considerably in this process, in part because of the Fourier series frequency loss of the D.C. pulse and the series resonant action of coil 72 and capacitor 74. Coil 72 and capacitor 74 are responsible for the positive overshoot 220 and 220' in each case.

Figure 11:
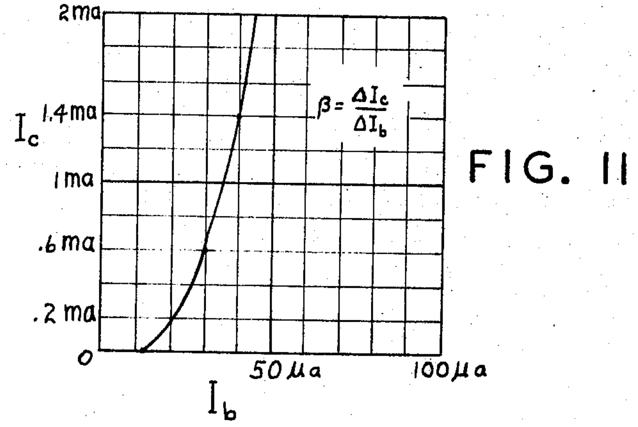
FIGURE 11 is a graph showing the variation of collector current with base current in one of the transistors used in the invention.

The portion of FIGURE 5 marked 222 shows the waveform without, and the portion marked 224 with, material passing between the plates of capacitor 20. As seen by comparing portion 222 with portion 224, the amplitude of the wave is increased by the presence of dielectric material between the plates of the capacitor. Transistors 70, 90 and 110 are biased to act as a class C amplifier to increase the amplitude difference produced by the two states of the capacitor. As seen in FIGURE 11, the value of $\beta=\Delta I_c/\Delta I_b$, where $\Delta I_c$ is the change in the collector current and $\Delta I_b$ is the change in the base current of each of the transistors 70, 90 and 110, increases in the operation of this invention with an increase in the base current of each of the transistors. Thus, for example, as seen in FIGURE 11, if transistor 70 receives a base current of 20 microamperes, a collector current of 0.2 milliamperes results, while a base current of 30 microamperes results in a collector current of 0.6 milliamperes. Therefore, $\beta$ increases from a value of 10 to a value of 20. As a result of this action, signal portion 224 of FIGURE 5 receives a greater amplification than signal portion 222. All changes in the waves produced by the present invention through transistor 170 are proportional to the change in capacitance caused by the presence of the dielectric, however.

Figure 6:
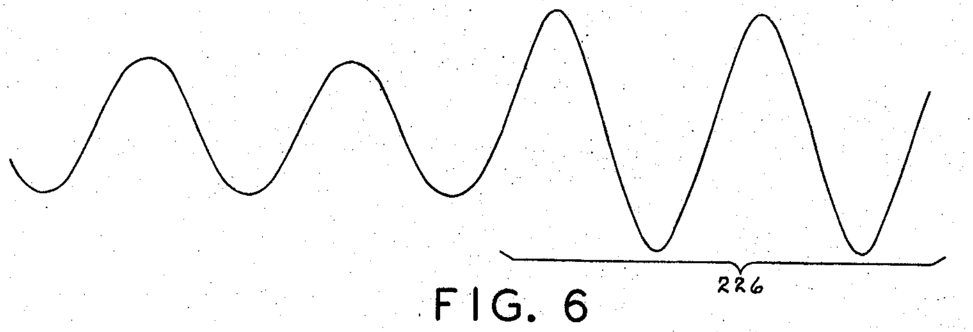
FIGURE 6 is a diagrammatic representation of the waveform at the collector of another one of the transistors shown in FIGURES 2 and 3.

As seen in FIGURE 6, the waveform at the collector of transistor 90 is a series of sine waves with a frequency of 20 kc., whose amplitude at numeral 226 is increased by the increase in amplitude at numeral 224. After this waveform has been modified by the circuitry preceding and immediately following transistor 110, as described previously, the saw-tooth wave shown in FIGURE 7 appears at the base of transistor 120, with numeral 228 denoting the portion of the saw-tooth occurring when no material is passing, and 230 when material is passing, between the plates of capacitor 20. Since the amplitude of part 230 is greater than that of part 228, while the frequency remains constant, the slope of portion 232 of each period of part 230 is necessarily greater than that of portion 234 of each period of part 228. Thus, the cutoff point 134 of transistor 120 requires the transistor to be non-conducting during a longer part of each cycle when an object is passing between the plates of capacitor 20 than otherwise. The waveform of FIGURE 8 results at the collector of transistor 120, with an increase in pulse width proportional to the change in capacitance of capacitor 20 when objects pass through that capacitor. Because of this action, any noise that may have been in the signal preceding transistor 120 is removed, and only the effect of changes in capacitor 20 remains.

Figure 9:
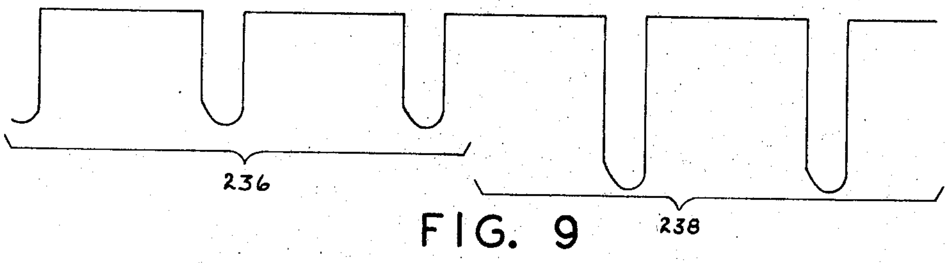
FIGURE 9 is a diagrammatic representation of the waveform at the base of a further transistor shown in FIGURE 2.

After the differentiator circuit together with transistor 140 has transformed the pulse width variations to amplitude modulations again, only the negative peaks of the pulses are allowed to pass zener diode 162 to reach the base of transistor 170 with a waveform as shown in FIGURE 9, numeral 236 denoting the form without, and 238 with dielectric between the plates of capacitor 20. The waveform, having increased voltage 239, at the collector of transistor 170, shown in FIGURE 10, is dependent only upon the variations in the capacitance of capacitor 20. Finally, the circuitry preceding transistor 190 filters out all but the rapid changes in the voltage caused by objects moving rapidly through the field of capacitor 20 and allows transistor 190 to react to their presence alone.

In use, objects on an assembly line pass through the field of capacitor 20, causing a rapid change in the capacitance of the capacitor. This change is amplified in the transistor stages corresponding to transistors 70 and 90, freed of noise in the stages corresponding to transistors 110 and 120, modified for use by the stages of transistors 140 and 170, and freed of any changes due to slow actions, such as a change in the humidity at capacitor 20, by the temperature compensating circuitry of transistor 210, and made ready for use in transistor 190.

Although the preceding description of the invention assumes a dielectric is passing through capacitor 20, it is well known that the capacitance will also increase when an ungrounded metal object passes through the capacitor, the increase depending on the size and shape of the object. Therefore, the invention will operate as previously described for both metallic and nonmetallic objects. Furthermore, since the machine as described reacts to swift changes in the capacitance only, it will detect the motion of objects. If an object is present in the field of the capacitor but not moving, capacitor 186 receives no voltage change, and therefore transistor 190 is not actuated. By variations in the values of capacitors 184 and 186, the rate of motion of the objects into the field of capacitor 20 necessary to actuate the present invention can be varied.

By varying resistor 76, any desired amount of energy may be transferred from capicitor 20 to transistor 70. In particular, the resistance may be lowered to the point that the basic voltage 240, as seen in FIGURE 10, can not be increased by any increase in the capacitance of capacitor 20. However, when a grounded metal object passes through the field of the capacitor, it absorbs energy, reducing the amount passing to transistor 70, and thus it produces a drop in the energy level at the collector of transistor 170.

To measure the actual change in capacitance of capacitor 20 for use in measuring the density or thickness of an object, a meter 34 may be connected in series with a resistor 242 between points 244 and 246 across resistor 182. Since the variation 239 of the waveform shown in FIGURE 10 at the collector of transistor 170 is dependent on the capacitance of capacitor 20, meter 34 can be calibrated to measure this difference and thus the differences in the objects passing between the plates of the capacitor.

Figure 12:
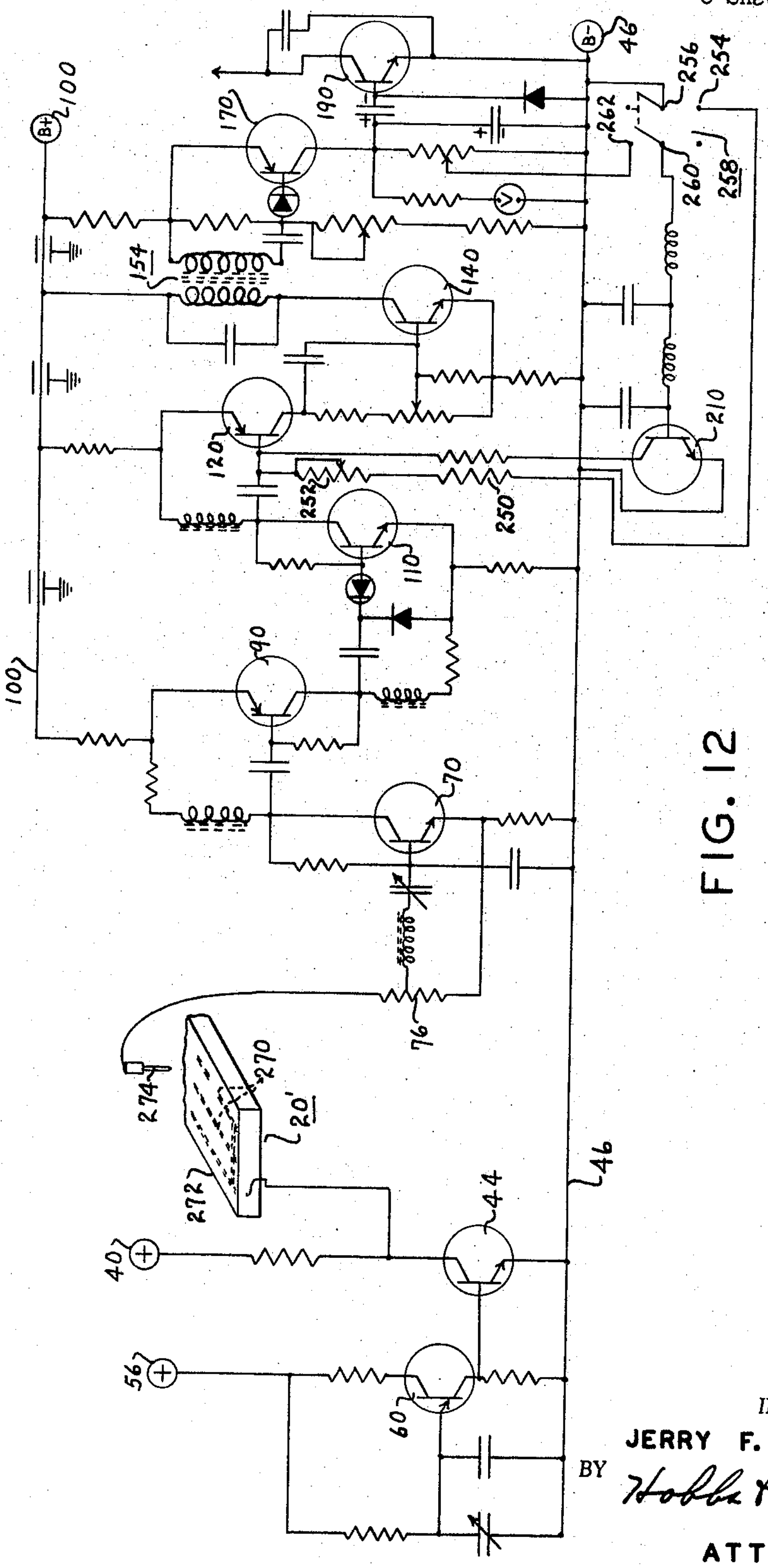
FIGURE 12 is a schematic diagram of the present invention modified for use for determining the position of the break in an open electrical circuit.

In some applications, meter 34 is required to measure small, slow changes in the capacitance of capacitor 20. This condition arises, for example, in detecting changes in the density or thickness of material passing through the capacitor. As seen in FIGURE 12, resistor 250 and variable resistor 252 are connected in series with terminals 254 and 256 of a double-pole, double-throw switch 258 between the base of transistor 120 and buss 46. The temperature control circuit is connected in series with terminals 260 and 262 of switch 258. Thus, to measure small changes in the capacitance of capacitor 20, which would be altered by the temperature compensation circuit, switch 258 is set to connect terminals 254 and 256 and leave the path between terminals 260 and 262 open. If it is desired to adapt the invention for a different use later, simply moving switch 258 to its other position prepares the device.

One problem solved by the device as modified in FIGURE 12 is the determination of the position of a break in buried or concealing wiring with accuracy. For many years, sidewalks and the like have been heated by electrical heating elements buried in the concrete. Occasionally these wires break, rendering part or all of the heating circuit useless. Past devices for locating the break for repair have been so inaccurate that many feet of concrete had to be removed to find the break even after the devices had approximately found the break. The present invention allows the determination of the position of a break within a few inches, using the electrical heating element 270 in cement 272 for one plate of capacitor 20′ and a probe 274 for the other plate. The transmitter sends its pulses into the circuitry 270 to be received and amplified by the probe and receiver portion of this invention. The probe is moved along the cement above the wiring, while the slow variations in the capacitance due to variations in the depth of the wiring in the concrete are compensated for by varying resistor 76. Because of this necessary slow adjustment, the temperature compensating circuit is removed from the circuit by the action of switch 258. When the break in the wiring is passed, there is a sudden decrease in the signal level. Thus, by watching for this sudden decrease, the position of the break can be determined very accurately.

In the claims, the terms "capacitor" and "capacitor plate" refer to a capacitor having plates constructed in any useful form of any useful materials, including plates made of iron or other metal or ones in the form of electrical circuitry. In addition, the terms "voltage variations," "amplitude variations" and "pulse width variations" refer to the respective variations in a signal passing through the circuitry of the present invention, and, when used in relation to a particular terminal within the invention, they refer to measurable changes with the progression of time in the voltages at those points.

Various changes and modifications may be made without departing from the scope of the present invention.

I claim:

1. A detector and measuring device utilizing a signal passing therethrough, comprising a capacitor having a plurality of plates, switching means for switching at an ultrasonic frequency, a transistor, the base of said transistor being connected to said switching means, the collector being connected to one of said plurality of plates, and the emitter being connected to ground, a voltage source connected to the collector of said transistor, a class C amplifier having a plurality of amplifying stages connected to another of said plurality of plates, a transistor, a zener diode connected to the base of said second mentioned transistor and to the output of said amplifier, said zener diode allowing only a portion of said signal to reach the base of said second mentioned transistor, a transistor having a base connected to the collector of said second mentioned transistor, said third mentioned transistor being biased to modify amplitude variations in said signal at the collector of said second mentioned transistor into pulse width variations, means connected to the collector of said third mentioned transistor for modifying said pulse width variations from said third mentioned transistor into amplitude variations, a transformer having a primary and a secondary winding, said primary winding being connected to said last mentioned means, a transistor having a base connected to said secondary winding, a meter, a high pass filter, said meter and said filter being connected to the collector of said last mentioned transistor, and a filter with a high time constant and a transistor connected in series between the collector of said last mentioned transistor and the base of said third mentioned transistor.

2. A measuring device utilizing a signal passing therethrough, comprising a capacitor, transmitting means connected to a plate of said capacitor for producing and transmitting to said capacitor said signal in the form of a direct current pulse having a maximum value and a minimum value, a class C amplifier connected to another plate of said capacitor, a transistor, a zener diode connected to the base of said transistor, a diode connected to said zener diode, said diode and said zener diode being connected to the output of said amplifier, a transistor having a base connected to the collector of said first mentioned transistor, said second mentioned transistor being biased to modify amplitude variations in said signal at the collector of said first mentioned transistor into pulse width variations of said signal, means connected to the collector of said second mentioned transistor for modifying said pulse width variations into amplitude variations, a transformer having a primary and a secondary winding, said primary winding being connected to said last mentioned means, a transistor having a base connected to said secondary winding, a meter connected to the collector of said last mentioned transistor, and a temperature control connected between the collector of said last mentioned transistor and the base of said first mentioned transistor.

3. A detector utilizing a signal passing therethrough, comprising a capacitor having a plurality of plates, switching means for producing said signal connected to one of said plurality of plates, a class C amplifier connected to another of said plurality of plates, a transistor, a zener diode connected to the base of said transistor, a diode connected to said zener diode, said diode and said zener diode being connected to the output of said amplifier, a transistor having a base connected to the collector of said first mentioned transistor, said second mentioned transistor being biased to modify amplitude variations in said signal at the collector of said first mentioned transistor into pulse width variations of said signal, means connected to the collector of said second mentioned transistor for modifying said pulse width variations from said second mentioned transistor into amplitude variations, a transformer having a primary and a secondary winding, said primary winding being connected to said last mentioned means, a transistor having a base connected to said secondary winding, a high pass filter connected to the collector of said last mentioned transistor, and a temperature control connected between the collector of said last mentioned transistor and the base of said second mentioned transistor.

4. A detector and measuring device utilizing a signal passing therethrough, comprising a capacitor, switching means for producing said signal connected to a plate of said capacitor, an amplifier connected to another plate of said capacitor, a transistor, a zener diode connected to the base of said transistor, said zener diode being connected to the output of said amplifier and allowing only a portion of said signal to reach the base of said transistor, a transistor having a base connected to the collector of said first mentioned transistor, said second mentioned transistor being biased to modify amplitude variations of said signal at the collector of said first mentioned transistor into pulse width variations, means connected to the collector of said second mentioned transistor for modifying said pulse width variations from said second mentioned transistor into amplitude variations, a transformer connected to said last mentioned means, a transistor having a base connected to said transformer, and a temperature control means controlled by the output of said last mentioned transistor for supplying a voltage to said second mentioned transistor to compensate for temperature changes.

5. A detector and measuring device utilizing a signal passing therethrough, comprising a capacitor, switching means for producing said signal connected to a plate of said capacitor, an amplifier connected to a plate of said capacitor, a transistor, a zener diode connected to the base of said transistor, said zener diode being connected to the output of said amplifier and allowing only a portion of said signal to reach the base of said transistor, a transistor having a base connected to the collector of said first mentioned transistor, said second mentioned transistor being biased to modify amplitude variations in said signal at the collector of said first mentioned transistor into pulse width variations, means connected to the collector of said second mentioned transistor for modifying said pulse width variations from said second mentioned transistor into amplitude variations, a transistor connected to said last mentioned means, and a temperature control means connected to said last mentioned transistor for counteracting the effect of temperature changes.

6. A detector utilizing a signal passing therethrough, comprising a capacitor, switching means for producing said signal connected to a plate of said capacitor, an amplifier connected to a plate of said capacitor, a transistor connected to the output of said amplifier, said transistor being biased to modify amplitude variations in said signal reaching the transistor into pulse width variations, means connected to the collector of said transistor for modifying said pulse width variations from said transistor into amplitude variations, a transformer connected to said last mentioned means, a transistor connected to said transformer, and a temperature control means connected to said first mentioned transistor for counteracting the effect of temperature changes.

7. A detector utilizing a signal passing therethrough, comprising a capacitor, switching means for producing said signal connected to a plate of said capacitor, a transistor, a zener diode connected to said transistor, said zener diode being connected to a plate of said capacitor and allowing only a portion of said signal to reach the base of said transistor, a transistor connected to said first mentioned transistor, said second mentioned transistor being biased to modify amplitude variations in said signal at the collector of said first mentioned transistor into pulse width variations, means connected to said second mentioned transistor for modifying said pulse width variations from said second mentioned transistor into amplitude variations, a transistor connected to said last mentioned means, a filter with a high time constant, and a transistor connected in series with said filter between said last mentioned transistor and said second mentioned transistor.

8. A detector utilizing a signal, comprising a capacitor, a transistor, a diode connected between said transistor and said capacitor, transistor means connected to said first mentioned transistor for modifying amplitude variations in said signal from said transistor into pulse width variations, means connected to said transistor means for modifying said pulse width variations from said transistor means into amplitude variations, a transistor connected to said last mentioned means, and a filter with a high time constant connected to said last mentioned transistor.

References Cited

UNITED STATES PATENTS

| | | | |
|---|---|---|---|
| 2,917,717 | 12/1959 | Thorsen | 332—15 |
| 2,925,559 | 2/1960 | Sautels | 330—23 |
| 2,957,136 | 10/1960 | Franz | 324—78 |
| 2,990,452 | 6/1961 | Harrison et al. | 330—23 X |
| 3,015,042 | 12/1961 | Pinckaers | 307—88.5 |
| 3,026,485 | 3/1962 | Suran | 331—108 |
| 3,056,047 | 9/1962 | Cooke-Yarborough | 324—78 |
| 3,064,197 | 11/1962 | Ek | 329—192 X |
| 3,136,961 | 5/1964 | Schraivogel | 332—15 |

RUDOLPH V. ROLINEC, *Primary Examiner.*

W. L. CARLSON, *Examiner.*

C. A. S. HAMRICK, E. E. KUBASIEWICZ, *Assistant Examiners.*